Patented Oct. 3, 1944

2,359,360

UNITED STATES PATENT OFFICE 2,359,360

ANTIOXIDANT

Carlin F. Gibbs, Cuyahoga Falls, Ohio, assignor to The B. F. Goodrich Company, New York, N. Y., a corporation of New York No Drawing. Application February 13, 1943, Serial No. 475,791

17 Claims. (Cl. 260—808)

This invention relates to the preservation of organic materials which tend to deteriorate by absorption of oxygen from the atmosphere and the means for preventing such deterioration. This application is a continuation-in-part of my application Serial No. 405,791, filed August 7, 1941.

The method of my invention comprises incorporating in the material to be preserved, as an antioxidant, a small proportion of a hydroxy alkenyl diarylamine or a hydrocarbon ether of such a compound. Among the materials which may be thus preserved are unsaturated fatty oils such as linseed oil or tung oil, petroleum oils such as gasolines, soaps, aldehydes, synthetic resins, turpentine, fish oils, rubber, and the like.

Any of the natural rubbers such as caoutchouc, balata, gutta percha, latex, as well as artificial rubber isomers, and such synthetic rubbers as polychloroprene, the copolymers of butadiene with acrylonitrile, styrene, isobutylene, methyl acrylate, methyl methacrylate, and the like, whether vulcanized or unvulcanized, may have their resistance to light, heat, and air greatly increased by the incorporation of a small amount, from 0.1 to 5.0% or more, of my new compounds in the rubber composition.

The antioxidants of my invention have the structure shown by the following general formula

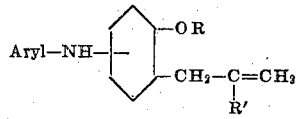

in which R and R' are members of the class consisting of hydrogen and functionally aliphatic hydrocarbon groups. The aryl nucleus may also contain substituents such as halogen, hydroxy, alkyl, aryl, amino, secondary alkyl amino, tertiary alkyl amino, alkenyloxy, anilino, mercapto, tertiary aryl amino, alkoxy, etc. By the term "functionally aliphatic hydrocarbon group" is meant any hydrocarbon group which functions like an aliphatic group; among such groups are alkyl, alkenyl, aralkyl, and the like. An important subclass of this broad group of diarylamines comprises the alkenyl arylamino monohydric phenols.

Among the compounds of my invention are 3-hydroxy-4-beta-methallyl-diphenylamine
3-methoxy-4-beta-methallyl-diphenylamine
3-beta-methallyl-4-hydroxyl-diphenylamine
3-beta-methallyl-4-methoxy-diphenylamine
3-beta-methallyl-4-ethoxy-diphenylamine
3-beta-methallyl-4-isopropoxy-diphenylamine
3-beta-methallyl-4-methallyloxy-diphenylamine
2-hydroxy-3-beta-methallyl-diphenylamine
2-methoxy-3-beta-methallyl-diphenylamine
2-ethoxy-3-beta-methallyl-diphenylamine
2-methallyloxy-3-beta-methallyl-diphenylamine
3-hydroxy-4-beta-ethylallyl-diphenylamine
3-ethoxy-4-beta-propylallyl-diphenylamine
3-beta-ethylallyl-4-hydroxy-diphenylamine
3-beta-propylallyl-4-butoxy-diphenylamine
2-hydroxy-3-beta-methallyl phenyl-beta-naphthylamine
3-hydroxy-4-beta-methallyl phenyl-beta-naphthylamine
3-beta-methallyl-4-methoxy phenyl xenylamine and the like.

As a specific example of my invention I shall describe the preparation and use of 3-beta-methallyl-4-hydroxy-diphenylamine. This material may conveniently be prepared by reacting one molecular proportion of p-hydroxy diphenylamine with about one molecular proportion of beta-methallyl chloride in the presence of about 1.5 molecular proportions of 10% alcoholic potash to form p-methallyloxy diphenylamine. The reaction is complete after the mixture has been refluxed for about two hours; the product may be separated by cooling the mixture, neutralizing, and filtering.

This product, when heated with about one-half its weight of diethylaniline as solvent for about thirty to fifty minutes at 200° C., is rearranged to 3 - beta-methallyl - 4 - hydroxy-diphenylamine. Other solvents such as dimethylaniline or various hydrocarbons may also be used. The product may be separated from the reaction mixture by distillation at reduced pressure. The material boils at 165° to 175° C. at 3 mm. pressure.

When one part by weight of 3-beta-methallyl-4-hydroxy diphenylamine is added to a rubber composition containing 100 parts by weight of rubber, 50 parts of carbon black, 5 parts of zinc oxide, 3 parts of sulfur, 3 parts of pine tar, 3.5 parts of stearic acid, and 1.0 part of mercaptobenzothiazole, and the composition is vulcanized, the resultant rubber stock retains its tensile strength and elongation at break to a much greater extent than does a similar vulcanized composition containing no antioxidant. The tensile strength of the composition containing no antioxidant, vulcanized 60 minutes at 279° F., dropped from about 3800 lb. per sq. in. to less than 900 lb. per sq. in. after aging four days in oxygen at 300 lb. per sq. in. pressure and at 70° C., whereas the tensile strength of the composition containing the antioxidant, vulcanized 60 minutes at 279° F., dropped from about 3900 lb. per sq. in. to about 2300 lb. per sq. in. The ultimate elongation of the stock containing no antioxidant dropped from 580 to 270% under these conditions, whereas that of the stock containing the antioxidant changed only from 565 to 415%.

Other similar compounds may be prepared by analogous methods. The nature of the alkenyl group and of the arylamino group may be varied by starting with the appropriate arylamino phenol and the appropriate beta-alkyl substituted allyl halide. The beta-alkyl group keeps its same position in the hydrocarbon chain after the rearrangement of the ether. The position of the arylamino group in the benzene ring has little effect upon the reaction, although the position para to the hydroxy group appears to favor the reaction more than the other positions. It should be noted that in the product the alkenyl group is ortho to the hydroxy group. If one ortho position is blocked by the arylamino group, then the alkenyl group will occupy the other.

The 3-beta-methallyl-4-hydroxy-diphenyl-amine described above may be further reacted with the halide of a functionally aliphatic hydrocarbon group in the presence of alcoholic potash, in the same manner as the starting material p-hydroxy diphenylamine was reacted, in order to obtain the corresponding hydrocarbon ether of 3-beta-methallyl-4-hydroxy-diphenylamine. Other alkenyl arylamino phenols may be similarly treated to form the corresponding ethers.

All of the above-described compounds are effective antioxidants, and give results similar to those obtained in the specific example described.

Any of the usual pigments, fillers, reinforcing agents, dyes, softeners, accelerators, vulcanizing agents, other antioxidants, or the like may also be present. The rubber compositions containing these new antioxidants may be used for a variety of purposes, such as for tires and tubes, hose, belting, molded goods, and the like. Such compositions may be vulcanized by any of the usual methods, as by steam, hot air, or in a mold.

Although I have described herein specific embodiments of my invention, I do not intend to limit myself solely thereto, but to embrace all of the obvious modifications within the scope of the appended claims.

I claim:

1. The method of preserving organic substances which tend to deteriorate by absorption of oxygen from the air which comprises incorporating therein a compound of the structure

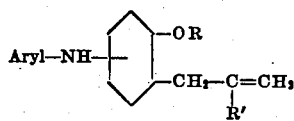

in which R and R' are members of the class consisting of hydrogen and functionally aliphatic hydrocarbon groups.

2. The method of preserving a rubber which comprises incorporating therein a compound having the structure

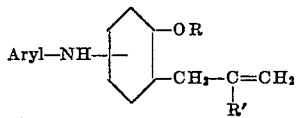

in which R and R' are members of the class consisting of hydrogen and functionally aliphatic hydrocarbon groups.

3. The method of preserving a rubber which comprises incorporating therein 3-beta-methallyl-4-hydroxy diphenylamine.

4. A composition comprising a rubber and a compound having the structure

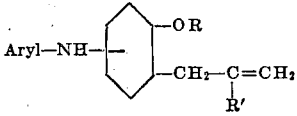

in which R and R' are members of the class consisting of hydrogen and functionally aliphatic hydrocarbon groups.

5. The method of preserving organic substances which tend to deteriorate by absorption of oxygen from the air which comprises incorporating therein a compound of the structure

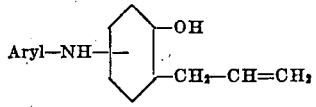

6. The method of preserving organic substances which tend to deteriorate by absorption of oxygen from the air which comprises incorporating therein a compound of the structure

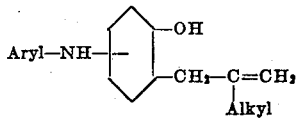

7. The method of preserving a rubber which comprises incorporating therein a compound of the structure

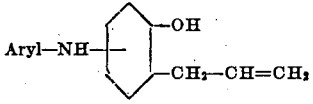

8. The method of preserving a rubber which comprises incorporating therein a compound of the structure

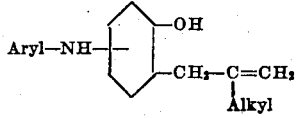

9. The method of preserving a rubber which comprises incorporating therein a compound of the structure

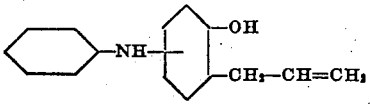

10. The method of preserving a rubber which comprises incorporating therein a compound of the structure

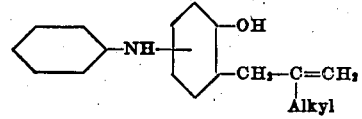

11. The method of preserving a rubber which comprises incorporating therein a compound of the structure

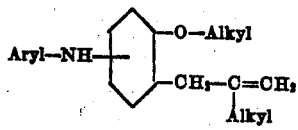

12. A composition comprising a rubber and a compound having the structure

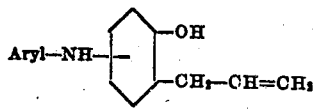

13. A composition comprising a rubber and a compound having the structure

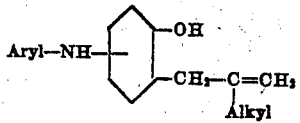

14. A composition comprising a rubber and a compound having the structure

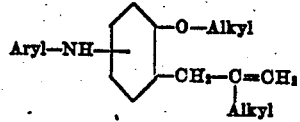

15. A composition comprising a rubber and a compound having the structure

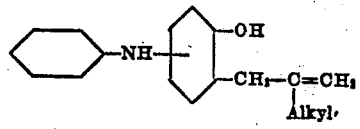

16. A composition comprising a rubber and a compound having the structure

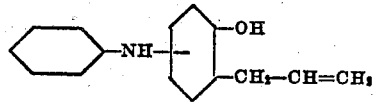

17. A composition comprising a rubber and 3-beta-methallyl-4-hydroxy diphenylamine.

CARLIN F. GIBBS.